June 4, 1957 M. KARLIN 2,794,855
TELEGRAPHY RECEIVER
Filed May 19, 1954
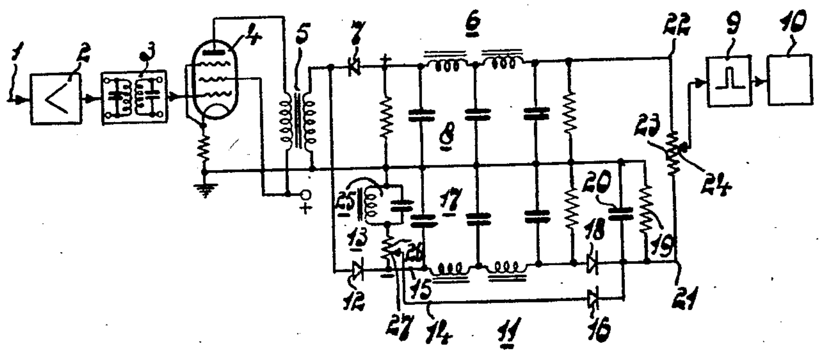
INVENTOR
MAURICE KARLIN
BY [signature]
AGENT 2,794,855

TELEGRAPHY RECEIVER

Maurice Karlin, Brussels, Belgium, assignor, by mesne assignments, to North American Philips Company, Inc., New York, N. Y., a corporation of Delaware Application May 19, 1954, Serial No. 430,933

Claims priority, application Netherlands May 21, 1953

3 Claims. (Cl. 178—70)

The invention relates to a telegraphy receiver in which, in order to obtain a distortion-free reproduction, the telegraphy pulses are supplied through a signal-pulse channel comprising an input detector and a delay network and through a bias-voltage channel comprising an input detector and a delay network to the input circuit of a pulse regenerator, the arrangement being such that the input circuit of the pulse regenerator has produced across it bias voltages derived from the bias-voltage channel, these pulses respectively leading and lagging in time relative to the telegraphy pulses derived from the signal-pulse channel.

In telegraphy receivers of the said kind, in which compared with the nominal signalling speed of 50 bauds a relatively narrow pass band of for example 120 c./s. is used, the telegraphy pulses reproduced by the pulse regenerator are found to be distorted to a troublesome extent. The level of distortion depends mainly on the ratio between the pass band and the nominal signalling speed and increases with an increase in signalling speed.

In accordance with the invention this difficulty in telegraphy receivers of the aforesaid kind is considerably reduced by having the output impedance of the input detector in the bias voltage channel constituted by the series combination of a series resistor and a parallel resonant circuit.

The invention and its advantages will now be described more fully with reference to the telegraphy-receiver according to the invention shown in the drawing.

The telegraphy receiver shown in the drawing forms part of a carrier-wave telegraphy system comprising 24 channels in which the carrier-wave pulses derived from a line 1 are supplied through an amplifier 2 and a channel-selection filter 3, having a bandwidth of for example 120 c./s. to the control-grid of a pentode 4, connected as a channel amplifier, the output impedance of which is constituted by a transformer 5.

In the arrangement shown the telegraphy pulses derived from the output transformer 5, these pulses having a nominal signalling speed of for example 50 bauds are supplied through a signal pulse channel 6 comprising an input demodulator 7 and a delaying network 8 to the input circuit of the pulse regenerator 9, the output voltage of which controls a registering apparatus 10, for example a reproducing relay.

In order to obtain a distortion-free reproduction of the telegraphy signal pulses the transformer 5 is connected to a bias voltage channel 11 of the pulse regenerator 9, having an input detector 12, across the output circuit of which channel pulsatory bias voltages occur, which lead and lag in time respectively, with respect to the telegraphy pulses derived from the signal pulse channel 6.

The leading and lagging bias voltage results, with a suitable proportioning of the bias voltage channel 11, in that operation of the pulse regenerator is insured during the entire period of time between the times of occurrence of the leading edge and trailing edge of the telegraphy pulses, the operation during this full time period being characteristic of a distortion-free reproduction and which time period, as is known per se, corresponds approximately to the time period between the half-way points of amplitude on the leading and trailing edges, it being understood that these edges have a slight slope since they do not occur instantaneously.

In the arrangement shown the bias voltage channel 11 is provided, in order to produce the leading and lagging bias voltage, with two branches 14 and 15, connected to the output impedance 13 of the detector 12 and through a rectifier 16 and the cascade connection of a delay network 17 and a rectifier 18 respectively to an output impedance formed by the parallel combination of a resistor 19 and a capacitor 20, the time constant of which output impedance is smaller than the duration of the shortest signal pulse.

In this arrangement the output voltages of the signal pulse channel and of the bias voltage channel, these voltages having different polarities, are supplied to different ends 21 and 22 respectively of a resistor 23, of which a tapping 24 is connected to the input circuit of the pulse regenerator 9. The tapping 24 is adjusted in a manner such that the maximum value of the signal pulse voltage derived from this tapping is approximately twice that of the bias voltage pulses; this means that at the instants when the leading and trailing edges of the telegraphy pulses derived from the signal pulse channel exceed half the maximum value of these pulses, the voltage required to cause the pulse regenerator 9 to respond, for example a voltage zero, occurs at the tapping 24.

In the arrangement described above the bias voltage of the pulse regenerator 9 is thus adjusted to the correct value for each individual telegraphy pulse, so that a distortion-free reception of the telegraphy pulses provided by the pulse regenerator 9 is obtained.

In the foregoing it is assumed that the pass band of the telegraphy receiver is sufficiently wide for the telegraphy pulses to attain their maximum values. If this condition is not fulfilled, considerable distortion of the pulses provided by the pulse regenerator 9 will occur in the arrangement described above for the shortest signal pulses.

Experiments have proved that these distortions of the shortest signal pulses are materially reduced by having the output impedance 13 of the input detector 12 constituted by the series combination of a resistor 26 and a parallel resonant circuit 25. The tuning frequency of the parallel resonant circuit 25 is approximately equal to twice the nominal signal frequency; in the present embodiment it may be, for the said numerical values, 60 to 80 c./s.

The improvement described above is realized, since for a short signal pulse the voltage across the parallel resonant circuit varies its maximum value during the duration of this signal pulse, because the resonant circuit tends to favor frequencies which cause a faster rate-of-change of the pulse voltage.

In the arrangement shown the branch 14 of the bias voltage channel 11 is connected to a tapping 27 of the series resistor 26 in the output impedance 13 of the detector 12, in order to provide that the output voltages of the two branches 14 and 15 should have approximately equal amplitudes; the voltage supplied to the branch 15 is subjected to a certain amount of attenuation in the delay network 17.

An important advantage of the telegraphy receiver according to the invention is that the signaling speed may be varied within wide limits, an excellent reproduction quality being maintained; in the embodiment shown the signalling speed may without objection be raised to 75 bauds.

What is claimed is:

1. A telegraphy receiver comprising a source of telegraphy pulses modulated on a carrier wave, a pulse regenerator, a first circuit connected between said pulse source and said pulse regenerator and comprising an input detector for detecting said pulses and a delay network for delaying said pulses, and a second circuit for producing biasing pulses and connected between said pulse source and said pulse regenerator and comprising an input detector for detecting said pulses and a parallel combination of a non-delay connection and a delay network having a longer delay time than the first-named said delay network, whereby the output signal of said second circuit comprises pulses which lead and lag each pulse which occurs at the output of said first circuit, and an output impedance connected to the last-named said input detector and comprising the series combination of a resistor and a parallel resonant circuit.

2. A telegraphy receiver as claimed in claim 1, in which said parallel resonant circuit is tuned to a frequency approximately corresponding to twice the nominal signalling frequency.

3. A telegraphy receiver as claimed in claim 1, in which said resistor is provided with a tap thereon, and in which said non-delay connection of said second channel is connected to said tap.

References Cited in the file of this patent

UNITED STATES PATENTS

| | | |
|---|---|---|
| 2,338,399 | Bingley | Jan. 4, 1944 |
| 2,681,949 | Van Zoest | June 22, 1954 |

FOREIGN PATENTS

| | | |
|---|---|---|
| 906,316 | France | May 14, 1945 |